United States Patent
Elo et al.

(10) Patent No.: US 7,086,002 B2
(45) Date of Patent: *Aug. 1, 2006

(54) SYSTEM AND METHOD FOR CREATING AND EDITING, AN ON-LINE PUBLICATION

(75) Inventors: Sara Elo, New York, NY (US); Louis Weitzman, Brookline, MA (US)

(73) Assignee: International Business Machines Corporation, Amronk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 112 days.

(21) Appl. No.: 09/404,163

(22) Filed: Sep. 27, 1999

(65) Prior Publication Data

US 2003/0204814 A1 Oct. 30, 2003

(51) Int. Cl.
*G06F 15/00* (2006.01)

(52) U.S. Cl. .................... 715/530; 715/513; 715/517; 715/523

(58) Field of Classification Search ............... 715/530, 715/517, 513, 523
See application file for complete search history.

(56) References Cited

U.S. PATENT DOCUMENTS

| | | | | |
|---|---|---|---|---|
| 5,425,138 A | | 6/1995 | Kumakawa ................ 715/510 |
| 5,659,742 A | * | 8/1997 | Beattie et al. ............ 707/104.1 |
| 5,845,073 A | | 12/1998 | Carlin et al. ................ 709/217 |
| 5,907,837 A | | 5/1999 | Ferrel et al. .................... 707/3 |
| 5,915,256 A | | 6/1999 | Rogers et al. ............ 715/501.1 |
| 6,182,029 B1 | * | 1/2001 | Friedman ........................ 704/9 |
| 6,243,713 B1 | * | 6/2001 | Nelson et al. ............ 707/104.1 |
| 6,424,979 B1 | * | 7/2002 | Livingston et al. .......... 715/511 |
| 6,438,543 B1 | * | 8/2002 | Kazi et al. ..................... 707/5 |
| 6,463,440 B1 | * | 10/2002 | Hind et al. ................. 707/102 |
| 6,507,857 B1 | * | 1/2003 | Yalcinalp ..................... 715/513 |
| 6,535,896 B1 | * | 3/2003 | Britton et al. .............. 715/523 |
| 6,538,673 B1 | * | 3/2003 | Maslov ........................ 345/853 |

\* cited by examiner

*Primary Examiner*—Joseph Feild
*Assistant Examiner*—R. Singh

(57) ABSTRACT

A system and method automatically generate an on-line document from raw text into an engaging, interactive form for a plurality of viewers. Unstructured articles are read from an information feed. A computation process extracts and tags proper names of people, products, organizations, and places and categorizes them. An image database is used to link these proper names with image files. The image database consists of a series of attribute-value pairs for active searching of names. A URL query string is input to the database to extract the location of the image in the database file system. An Extensible Markup Language (XML) file is created from the raw text of the article, the list of proper names in the processed data and the image file references. The XML file is stored in a file system. An Extensible Stylesheet Language (XSL) file provides templates containing computational relationships between the text and images. The XML and XSL style sheets are combined to generate a Hypertext Markup Language (HTML) file containing an on-line story of the unstructured articles in a Java Applet which allows the system to provide a variety of interactive behaviors for a final presentation available by a viewer from a browser.

16 Claims, 3 Drawing Sheets

SYSTEM 10

PROCESS 50

SYSTEM AND METHOD FOR CREATING AND EDITING, AN ON-LINE PUBLICATION

BACKGROUND OF THE INVENTION

1. Field of Invention

This invention relates to electronic publishing and methods of operation. More particularly, the invention relates to a system and method of creating, editing an on-line publication.

2. Background of Invention

On-line communication systems enable users equipped with a microcomputer and a modem or LAN connection to communicate with a variety of related information services including bulletin boards, news servers, weather services, and the like. Filling the information requirements of such services in an on-line information system is a complex and time-consuming process due to the creation, editing and integrating of different texts and images into an integrated document that is relevant and accurate to a plurality of viewers.

What is needed is a system and method to create and edit content from raw data augmented with images to produce an on-line, interactive and dynamic presentation of the content. Preferably, the content is created by combining known information processes with object-oriented, interpretative software in a unique series of steps to achieve a practical and effective on-line publication with current, informative and interesting articles of interest.

SUMMARY OF THE INVENTION

An object of the invention is a system and method of operation for creating, editing content for an on-line publication.

Another object is a system and method for automatically creating and constructing interactive and dynamic presentations of contents from unstructured information feeds and augmenting the feed with images for an on-line publication.

Another object is a system and method for creating and editing on-line publications using Internet standard processes and object-oriented, interpretive software.

These and other objects, features and advantages are achieved in a system and method which automatically generate an on-line document from raw text into an engaging, interactive form for a plurality of viewers. Unstructured articles are read from an information feed. A computation process identifies and categorizes proper names of people, products, organizations, and places. The proper names are linked to an image in an image database. An entry in the database consists of attribute-value pairs that enable searching on names of the entry. An Extensible Markup Language (XML) file is created from the article, the proper names contained in it and the image references returned from the image database. The XML file is stored in the file system. An Extensible Stylesheet Language (XSL) file provides templates containing computational relationships between the text and images. The XML and XSL style sheets are combined to generate a Hypertext Markup Language (HTML) file containing an on-line story of the now structured articles in a Java Applet. This separation of form and content allows the system to provide a variety of interactive behaviors for a final presentation available by a viewer from a browser.

DESCRIPTION OF DRAWING

The invention will be further understood from the following detailed description of a preferred embodiment taken in conjunction with an appended drawing, in which.

DESCRIPTION OF PREFERRED EMBODIMENT

The present invention describes a process that takes unstructured data feeds and automatically constructs an interactive and dynamic presentation of the content in the unstructured data feeds.

Figure 1:
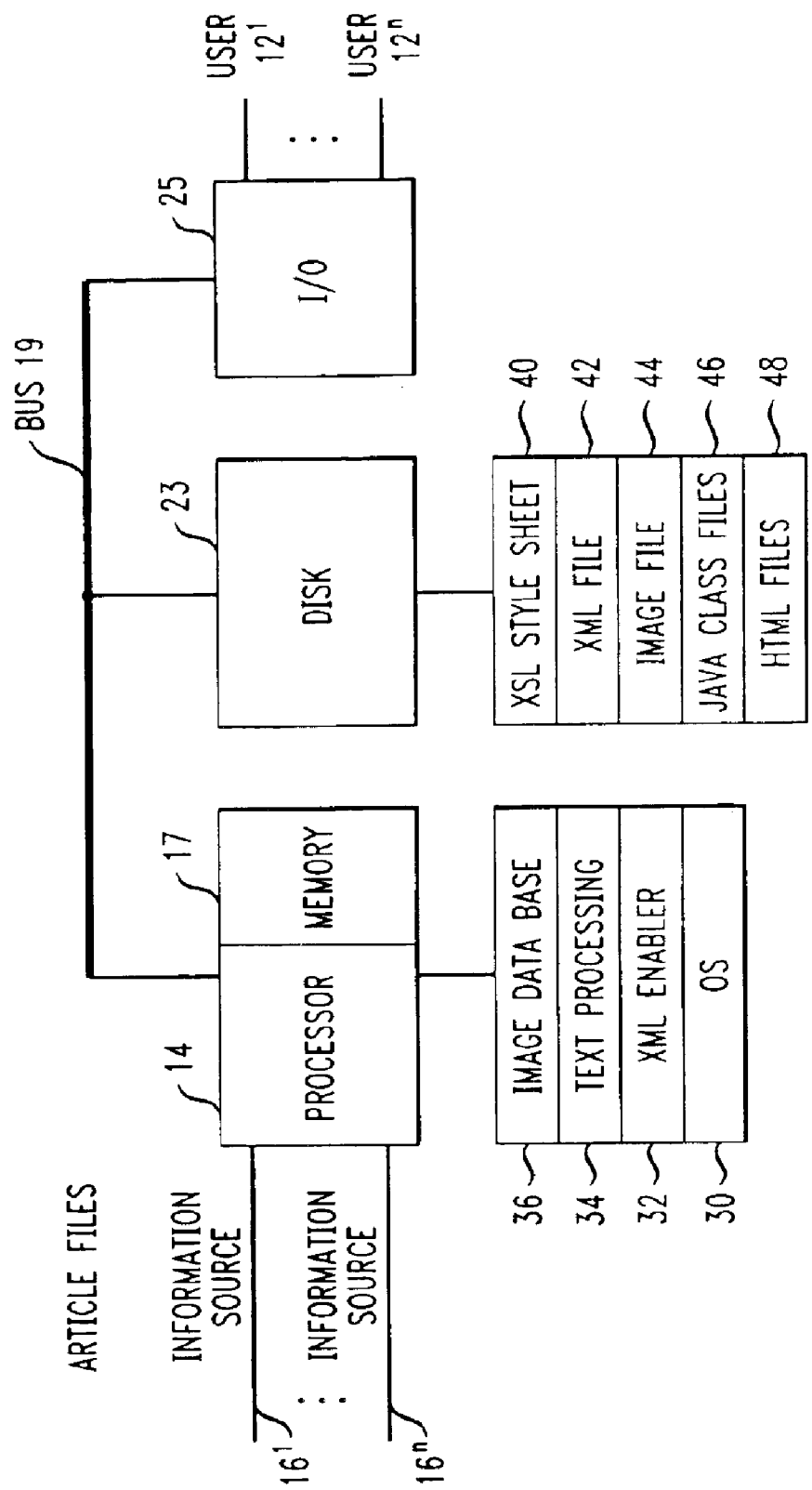
FIG. 1 is a block diagram of a system for creating, editing an on-line publication incorporating the principles of the present invention.

In FIG. 1, a system 10 creates and edits a dynamically interactive publication for display to viewers $12^1$, $12^n$ at terminals (not shown). A process controller 14 receives articles or files from information sources $16^1$, $16^n$ for processing into the interactive publication as will be described hereinafter. The controller is coupled to a memory 17 and through a bus 19 to a storage disk 23 and I/O 25 including a keyboard, modem or LAN, display, etc. (all not shown). The I/O couples the system 10 to the viewers $12^1$, $12^n$. The memory 17 includes stored program instructions for a standard operating system 30; an Extensible Markup Language (XML) Enabler 32; a text-processing module 34, and an image database 36 A description of XML may be found on the World Wide Web (Web) at http://www.w3org/XML.

The storage disk 23 includes data files interacting with the stored program instructions in the memory 17. Stored in the disk 23 are Extensible Stylesheet Language (XSL) files 40; XML files 42; image files 44; Java class files 46; and Hypertext Markup Language (HTML) files 48. XSL combines with XML to produce HTML web documents. Hypertext Markup Language (HTML) is a language with which web pages are designed. A description of HTML may be found on the Web at http://www w3.org/Markup. A description of XSL may be found on the Web at "http://www.w3.org/Style/XSL". The Java class files 46 are used to generate Java applets, which are small computer programs that run inside a Java-compatible browser such as Netscape Navigator. A description of Java may be found on the Web at "http://java.sun.com". It should be understood that other object oriented, interpretive run-time programs, may be substituted for Java including DHTML or other proprietary implementations, which take parameterized input.

Figure 2:
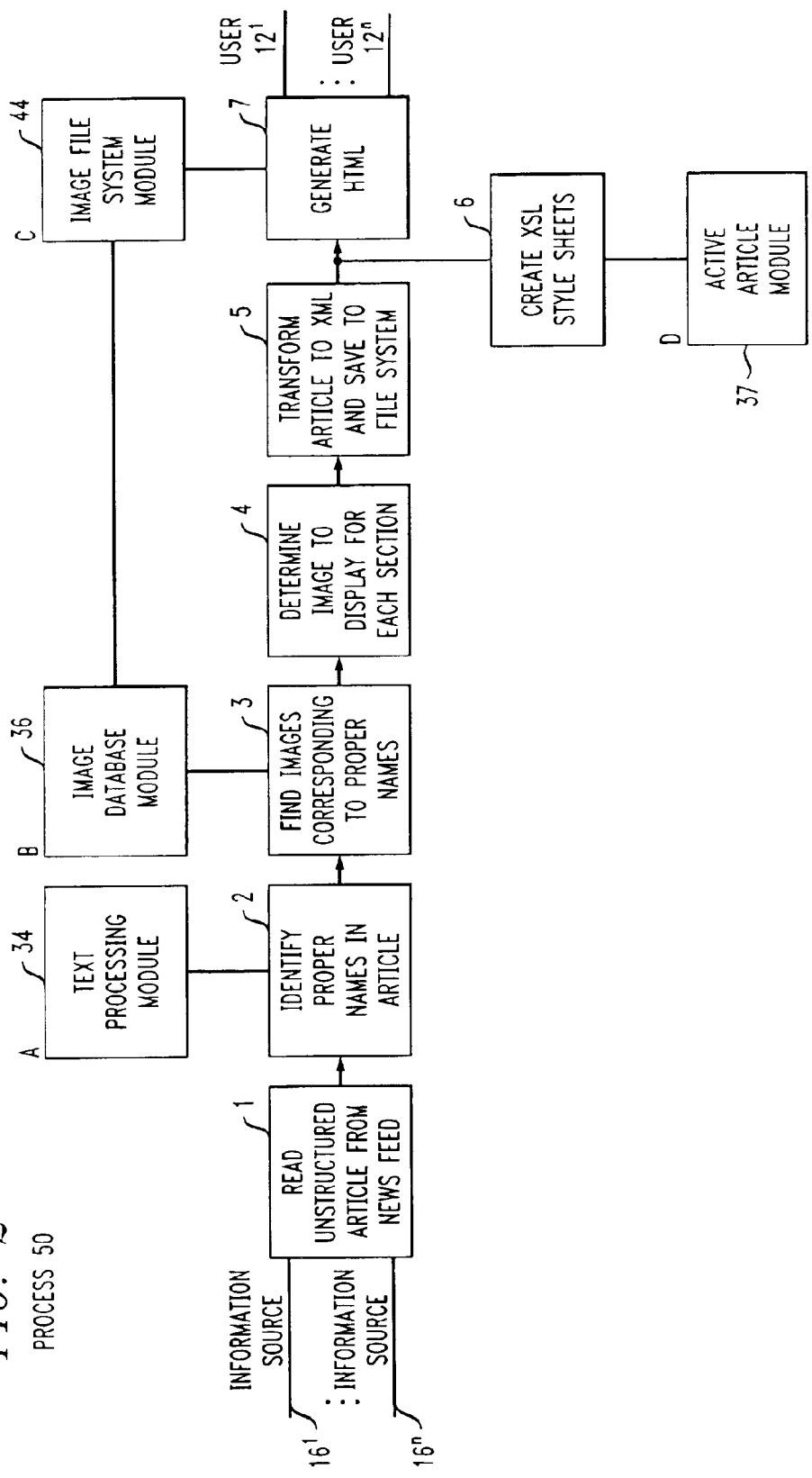
FIG. 2 is a flow diagram of the steps managed and controlled by the system of FIG. 1 in producing an interactive presentation to a user through a browser.

FIG. 2 illustrates a process 50 referred to as "ActiveNews" which is executed on System 10 under the control of process controller 14 including stored programming instructions for executing a series of Steps 1–7 shown in FIG. 2 which will be described in conjunction with FIG. 1.

In process 50 clear boxes indicate processing steps within a designated algorithm. Dark boxes indicate modules and resources upon which the process step relies. Process 50 begins in Step 1 in which the processor receives an article from an information source 16 with a title and article body. The article is a plain text or an HTML document and does not contain any other structure or markup. Typically the article is received as a zip collection of files via File Transfer Protocol (FTP), Step 1 extracts the articles, and writes them into a file system. Articles are then read one at a time into Step 2 of the process.

In Step 2, the controller passes the article to the text-processing module 34 and stores the results with the article into a document object held in memory 17. The text processing module provides the offset and length of each occurrence of any proper name found as well as its canonical form (the base form of the name) and the category (person, place, organization, and product). This information is translated into an XML text buffer with proper names converted to tagged elements in the article. A document object is then created in memory from the text buffer. These intermediate results are not written to disk but are passed in memory 17 from step 2 to step 3. The document object created includes the article, with each paragraph containing 0 or more proper names. With these proper names are attributes to describe its canonical form and category.

One text-processing module 34 used in the process is "Talent" containing an internal module called "Nominator". Talent is described on the Web at "http://www.research.ibm.com/irgroup/talent". Nominator is described in a paper entitled "Disambiguation of Proper Names in Text" which is available on the Web at "http://www.research.ibm.com/people/r/ravin/anlp97.ps". Nominator analyzes the text and finds occurrence of proper names. For the name found, Nominator determines if a single canonical form can represent more than one proper name expression in the same document. Nominator also returns the category of each name. By default, Nominator determines the categories—person, place or organization based on an algorithm that combines dictionaries and rules. In addition, Nominator can find names listed in a user provided dictionary. For the ActiveNews Process 50, a product dictionary with canonical forms of product names and their possible variations was used. The product dictionary allows Nominator to find names that belong to the additional category product.

In Step 3, images corresponding to proper names are found by queries in the Image Database Module 36. A query is made to the image database 36 for images corresponding to proper names and the results are added to the document object held in memory 17. Document objects containing articles and marked up proper names with added attributes for corresponding images are provided to Step 4.

Continuing in Step 3, the Image Database 36 receives a URL query string containing a proper name. The Database generates a list of all elements matching the query. The list can contain zero, one or more elements. Each element contains a pointer, a URL to the image file stored in the file system.

In one embodiment, a Lightwight Directory Access Protocol (LDAP) database contains description of elements of IBM executives, IBM products and company logos. A description of these elements consists of a series of attributes-value pairs, including the name of the person, product or company, as well as variations of the name (e.g., "Lou Gerstner" or "Louis Gerstner") for more accurate searching on names. One attribute of these elements is a pointer (URL) to an image in the file system 44. The input to the LDAP database is a URL query string that specifies which category name to search (e.g., http://database_directory_name/media/who/name=lou%20gerstner). The output result list of the database is formatted in XML, which allows a client to use standard XML parsing tools to extract the location of the image in the file system. A representative database query result is shown in Appendix I.

In Step 4, the process determines the images to display in the final dynamic presentation and adds the information to the document object to contain all element and attribute tags needed by the XSL style sheets in step 6 to generate the final, savable HTML file in step 7. The document object representing the article with proper name tags and corresponding image attributes are received at Step 4 and the output is a final document object consisting of articles with all elements and attribute tags necessary for XSL style sheets.

Step 4 depends on two parameters, the minimum number of images to create ActiveNews article and the maximum number of images to display in the ActiveNews article. A separate, temporary data structure is used to store intermediate results needed in image selection of step 4.

At the beginning of Step 4, the document object in memory represents the paragraphs of the article, and each paragraph contains zero or more proper names. Proper names may contain a URL to an image if it was found in the Image Database Module. At the end of Step 4, paragraphs are combined into sections, where each section defines a state in the final dynamic presentation. Each section contains one or more paragraphs and only one image corresponding to a proper name. The first section of the article represents the initial state when the article is first displayed.

The image selection process is as follows:

1. The number of unique proper names with associated images, or valid names, in the article are counted. If the number is less than the minimum number of images necessary, the article is not transformed into an Active News Article. The process exits and goes back to Step 1 to process the next article in the feed. Otherwise, the number of occurrences of each valid name is counted and stored in a temporary structure. All valid names are ranked by frequency.
2. The paragraphs are processed one-by-one, starting with the paragraph with the most occurrences of the most frequently occurring name in the entire article.
3. For each paragraph:
    (i) if the paragraph has only one valid name an indication is made in the document object that the corresponding image will be displayed in the final presentation by setting the "active" attribute of the proper name element to "true". This name and image cannot be reused in any other paragraph.
    (ii) If a paragraph has more than one valid name, "active" tag is set to "true" for the name with the highest frequency in the paragraph. In the case of a tie, the first name is selected. The "active" tag remains unset for all other names in the paragraph. Once a paragraph has one "active" tag of one proper name set to "true", the paragraph is not processed for other proper names. After all paragraphs are processed, all paragraphs have been assigned either one image or no image to be displayed in the final presentation.
    (iii) All paragraphs are grouped into section tags. Two consecutive paragraphs are grouped together into a section as long as only one paragraph has a valid name and image link. Each section, except for the first section which may not have an image, should have only one valid name and image to display. The process then transitions to Step 5.

In Step 5, the process transforms articles into the text representation of an XML object and saves it to an XML file on disk 42. The XML file includes all of the appropriate elements and attributes that are needed by the XSL style sheets to construct HTML for a Java Applet.

Figure 3A:
FIGS. 3A is a representation of an Active News article as a Java applet created and edited in the system of FIG. 1 and the process of FIG. 2 for on-line publications.

In Step 6 the XSL style sheets are created. The XSL style sheets created are combined with the XML files to produce the final HTML to be delivered to the viewer browsers Step 6 represents the manual creation of one or more XSL style sheets. The creation of the style sheet is a one-time task. Each XSL Style Sheet represents different ActiveArticle layouts, or other types of layouts possible. The output of running these style sheets with an XML file created in Step 4 produces HTML. The HTML generated includes the appropriate parameters for an ActiveArticle applet. A screen shot of a running active news article is shown in FIGS. 3A and B.

Figure 3B:
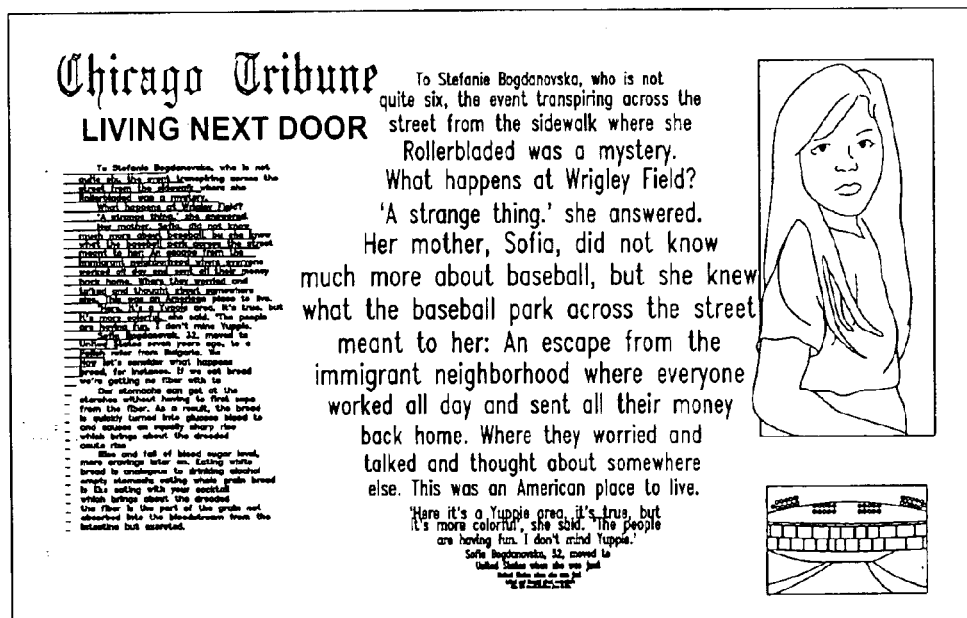
FIG. 3B is a representation of the Active Article applet, Module D of FIG. 2.

An ActiveArticle module 37 provides the specification of how to create a Java applet for a running ActiveArticle. The Active Article is a Java applet whose display is divided into three sections as illustrated in FIG. 3B. In the center, a few lines of the main text of the article are in focus and enlarged type. The type size of other lines of the article is proportional to their distance from the text in focus, thus creating a "fish eye lens" effect. On the left side of the display is a scaled down version of the complete article. A scroll bar tracks the viewer's progress through the article by highlighting the lines of the article in focus One way for the viewer to control focus is by manipulating the scroll bar. The viewer can also scroll the article by clicking and dragging on the main text. Located on the right-hand side of the display are images linked to sections of the text through Stylesheet-defined elastic relationships. Each successive section is represented by a different graphical layout that specifies how images scale and position themselves. As the viewer passes into a new section, ActiveArticle triggers a smooth animated transition of the image layouts, visually representing a shift in context. The viewer can also select an image to bring it into focus and display its caption.

Since ActiveArticle is a Java applet, the parameters to ActiveArticle are passed in as the parameters of the Java applet. Different sections within an ActiveArticle are delineated within the "text" parameter by the character "|" (vertical bar). If there are five sections, the input must contain four vertical bars. The parameter "NumOfStates" as composed, identifies how many sections exist in the ActiveArticle.

In addition, attributes for each image must be specified. The name of the image is listed in the "pictures" parameter. Additional parameters for each picture are specified in the parameter "infoForPictureN" where N is the position starting with zero (0) in the "pictures" parameter. The values in the "infoForPictureN" parameter are the caption, the scale factor for each section, the x value for each section, and the y value for each section. The relevant ActiveArticle applet parameters for atypical HTML file are shown in Appendix II.

In Step 7, the final HTML file is created ready for input into a dynamic presentation. The XML and XSL files are received as an input. The HTML file can be generated in a number of ways. Viewer-side generation of HTML is possible in the new generation of browsers such as Microsoft's Internet Explorer 5.0. However, the HTML file can be produced and served to browsers that are not XML/XSL aware. The HTML file can be generated on the server side with technology such as XML Enabler, code freely available from IBM's AlphaWorks site. XML Enabler is a server side technology that combines XML files with XSL style sheets and creates and serves the HTML for the browsers to view A description of the XML Enabler is available on the Web at: "http://www.alphaworks.ibm.com/tech/xmlenabler".

The Image File System module 44 stores image files associated with entries in the image database module. In one embodiment, a Distributed File System stores the image of files associated with entries in a directory. The images are stored in a directory accessible by an Apache web server by their "http" address in the final HTML that is generated

```
Appendix 1:
    e.g.     <?xml version="1.0" ?>
           - <slaphapi>
                  <status error-code="0" object-count="1">Ok</status>
             - <object>
                       <status error-code="0">Ok</status>
                       <dn>who=Lou Gerstner,ou=who,ou=media,o=ibm.com</dn>
                  - <attributes>
                           <cn>Louis Gerstner</cn>
                           <commonname>Lou Gerstner</commonname>
                           <commonname>Louis Gerstner</commonname>
                           <commonname>Louis V. Gerstner</commonname>
                           <commonname>Louis V. Gerstner, Jr.</commonname>
                           <commonname>Gerstner</commonname>
                           <description>CEO of IBM Corporation</description>
                           <imageurl>http://vec125/image/who/lou_gerstner.gif</imageurl>
                           <objectclass>who</objectclass>
                           <uid>123456</uid>
                           <who>Lou Gerstner</who>
                           <whotype>IBM employee</whotype>
                    </attributes>
             </object>
        </slaphapi>
Appendix II:
    <APPLET    CODE        = "ActiveArticle.class"
               CODEBASE    = "Code/"
               NAME        = "ActiveNews"
               WIDTH       = "600"
               HEIGHT      = "600"
               ALIGN       = "BOTTOM">
        . . .
        <PARAM NAME = "numOfStates" VALUE="7">
        <PARAM NAME = "pictures"    VALUE="picture1.gif picture2.gif picture3.gif">
        <PARAM NAME = "infoForPicture0" VALUE = "caption for picture 0
```

```
                        -continued

| 0.250 0.750 0.250 0.250 1.000 0.250 0.250
| 500       450      500      500      275      500      500
| 100        75      200      275      230      153      153">
...
<PARAM NAME = "text" VALUE = "text in section 1
              | text in section 2
              | text in section 3">
        ...
        </APPLET>
```

While the invention has been shown and described in preferred embodiment, various changes may be made without departing from the spirit and scope of the invention as defined in the appended claims, in which.

We claim:

1. A method of creating a dynamic representation from data received from an information source, comprising the steps of:
   storing the data received from the information source;
   identifying at least one text instance in the data using a text processing module;
   finding one or more images in an image database module relating to the at least one text instance;
   selecting at least one image from the one or more found images to display with the data, comprising the steps of:
     identifying a number of unique text instances with associated images in the data;
     comparing the number of unique text instances with a minimum number and terminating the method if the number of unique text instances is less than the minimum number;
     storing the number of unique text instances in a temporary structure;
     ranking the unique text instances by their frequency in the data;
     processing paragraphs of the data beginning with the paragraph having the most unique text instances;
     indicating in a document object that an image corresponding to the most frequent unique text instance in a paragraph will be displayed in the dynamic representation of the paragraph; and
     grouping paragraphs into sections, wherein two consecutive paragraphs are grouped together if one paragraph has a unique text instance and an image link so that each section has a unique text instance and an image to display; and
   generating the dynamic representation of the data from the at least one selected image and the data.

2. The method of claim 1, wherein the generating step further comprises:
   transforming the data and the at least one selected image into an Extensible Markup Language (XML) object saved to an XML file in a storage disk;
   creating at least one Extensible Stylesheet Language (XSL) style sheet in a storage disk; and
   combining an XSL style sheet with the XML file to produce a Hypertext Markup Language (HTML) file representing a dynamic representation of the data.

3. The method of claim 1, wherein the data comprises an article title and body.

4. The method of claim 1, wherein the data comprises an HTML document.

5. The method of claim 1, wherein the data comprises a digital news feed.

6. The method of claim 1, wherein the step of identifying at least one text instance comprises the step of identifying an offset and a length of each text instance occurrence.

7. The method of claim 1, wherein the step of storing data comprises the step of receiving data as a compressed collection of files via a file transfer protocol.

8. The method of claim 1, wherein the step of identifying at least one text instance comprises the step of identifying proper names in the data.

9. The method of claim 1, wherein the step of identifying at least one text instance comprises the step of providing a canonical form and a category of each text instance.

10. The method of claim 1, wherein the step of identifying the at least one text instance comprises the steps of:
    translating identifying information into an XML text buffer, wherein each text instance is converted into tagged elements in the data; and
    creating a document object from the XML text buffer, wherein the object comprises the data and the at least one text instance.

11. The method of claim 1, wherein the step of finding images comprises the steps of:
    sending a query in the form of a Uniform Resource Locator (URL) string to the image database module; and
    generating a list of elements matching the query in the image database module, wherein each element comprises a URL to an image file stored in the file system.

12. The method of claim 1, wherein, in the step of combining paragraphs of the data into sections, each section defines a state in the dynamic representation, and each section comprises at least one paragraph and a single image corresponding to a text instance.

13. The method of claim 2, wherein, in the step of transforming the data and images, the XML file comprises elements needed by an XSL style sheet to construct HTML into a dynamic representation.

14. The method of claim 2, wherein each XSL style sheet represents a different layout.

15. An apparatus for creating a dynamic representation from data received from an information source, the apparatus comprising:
    a memory; and
    at least one processor coupled to the memory and operative to: (i) store the data received from the information source in a file system; (ii) identify at least one text instance using a text processing module; (iii) find one or more images in an image database module relating to the at least one text instance; (iv) select at least one image from the one or more found images to display with the data, comprising the operations of: (a) identifying a number of unique text instances with associated images in the data; (b) comparing the number of unique text instances with a minimum number and terminating the method if the number of unique text instances is less than the minimum number; (c) storing the number of unique text instances in a temporary structure; (d) ranking the unique text instances by their frequency in the data; (e) processing paragraphs of the data beginning with the paragraph having the most unique text instances; (f) indicating in a document object that an image corresponding to the most frequent unique text instance in a paragraph will be displayed in the dynamic representation of the paragraph; and (g) grouping paragraphs into sections, wherein two consecutive paragraphs are grouped together if one paragraph has a unique text instance and an image link so that each section has a unique text instance and an image to display; and (v) generate the dynamic representation of the data from the at least one selected image and the data.

16. An article of manufacture for creating a dynamic representation from data received from an information source, comprising a machine readable medium containing one or more programs which when executed implement the steps of:

storing the data received from the information source in a file system;

identifying at least one text instance in the data using a text processing module;

finding image in one or more images in an image database module relating to the at least one text instance;

selecting at least one image from the one or more found images to display with the data, comprising the steps of:

identifying a number of unique text instances with associated images in the data;

comparing the number of unique text instances with a minimum number and terminating the method if the number of unique text instances is less than the minimum number;

storing the number of unique text instances in a temporary structure;

ranking the unique text instances by their frequency in the data;

processing paragraphs of the data beginning with the paragraph having the most unique text instances;

indicating in a document object that an image corresponding to the most frequent unique text instance in a paragraph will be displayed in the dynamic representation of the paragraph; and grouping paragraphs into sections, wherein two consecutive paragraphs are grouped together if one paragraph has a unique text instance and an image link so that each section has a unique text instance and an image to display; and generating a dynamic representation of the data from the at least one selected image and the data.

\* \* \* \* \*